(12) United States Patent
Bu et al.

(10) Patent No.: US 11,835,220 B2
(45) Date of Patent: Dec. 5, 2023

(54) OPTICAL BEAM EXPANDER AND LUMINAIRE

(71) Applicants: SUZHOU OPPLE LIGHTING CO., LTD., Suzhou (CN); OPPLE LIGHTING CO., LTD., Shanghai (CN)

(72) Inventors: Chenxi Bu, Suzhou (CN); Shuchao Li, Suzhou (CN); Yisheng Xiao, Suzhou (CN)

(73) Assignees: SUZHOU OPPLE LIGHTING CO., LTD., Jiangsu (CN); OPPLE LIGHTING CO., LTD., Shanghai (CN)

( * ) Notice: Subject to any disclaimer, the term of this patent is extended or adjusted under 35 U.S.C. 154(b) by 21 days.

(21) Appl. No.: 17/561,640

(22) Filed: Dec. 23, 2021

(65) Prior Publication Data
US 2022/0136677 A1    May 5, 2022

Related U.S. Application Data

(63) Continuation of application No. PCT/CN2020/137192, filed on Dec. 17, 2020.

(30) Foreign Application Priority Data

Dec. 19, 2019    (CN) .......................... 201922307424.3

(51) Int. Cl.
*F21V 5/04* (2006.01)
*F21V 5/00* (2018.01)
(Continued)

(52) U.S. Cl.
CPC ............ *F21V 5/008* (2013.01); *F21V 7/0091* (2013.01); *F21V 13/04* (2013.01); *G02B 27/0955* (2013.01)

(58) Field of Classification Search
CPC .......... F21V 5/008; F21V 5/045; F21V 7/048; F21V 13/04
See application file for complete search history.

(56) References Cited

U.S. PATENT DOCUMENTS 4,755,921 A    7/1988    Nelson
6,402,347 B1 *    6/2002    Maas ................. G02B 19/0066
                                                                362/547
(Continued)

FOREIGN PATENT DOCUMENTS

CN    101238735 A    8/2008
CN    203771293 U    8/2014
(Continued)

OTHER PUBLICATIONS

International Search Report of PCT Application No. PCT/CN2020/137192 dated Mar. 2, 2021 with English translation, (4p).

*Primary Examiner* — Julie A Bannan
(74) *Attorney, Agent, or Firm* — Arch & Lake LLP

(57) ABSTRACT

An optical beam expander and a luminaire, including: a collimating lens configured for adjusting light emitted by a light source to parallel light; a condensing lens, the condensing lens including a plurality of inclined light-control surfaces, and any one of the light-control surfaces is not parallel to a plane in which the condensing lens is located, the condensing lens being configured for refracting the parallel light emitted from the collimating lens towards a direction of a center line of the condensing lens; and a fixing component, configured for fixing the collimating lens and the condensing lens, so that an optical axis of the collimating lens coincides with an optical axis of the condensing lens.

9 Claims, 6 Drawing Sheets

(51) Int. Cl.
    *F21V 7/00*          (2006.01)
    *F21V 13/04*        (2006.01)
    *G02B 27/09*       (2006.01)

(56) References Cited

U.S. PATENT DOCUMENTS

| | | | |
|---|---|---|---|
| 7,742,217 B2 | 6/2010 | Kamm et al. | |
| 2005/0024746 A1* | 2/2005 | Shimura | G02B 3/08 |
| | | | 359/742 |
| 2005/0201101 A1* | 9/2005 | Shimura | G11B 7/1374 |
| | | | 362/333 |
| 2006/0056185 A1* | 3/2006 | Morino | G02B 3/08 |
| | | | 362/337 |
| 2008/0204847 A1 | 8/2008 | Kamm et al. | |
| 2012/0075870 A1* | 3/2012 | Kayanuma | F21V 5/045 |
| | | | 362/333 |
| 2014/0036510 A1* | 2/2014 | Preston | F21V 5/00 |
| | | | 362/296.01 |
| 2017/0227190 A1* | 8/2017 | Fujikawa | G02B 1/04 |
| 2018/0143355 A1* | 5/2018 | Hu | F21V 13/04 |

FOREIGN PATENT DOCUMENTS

| | | |
|---|---|---|
| CN | 106813154 A | 6/2017 |
| CN | 107246590 A | 10/2017 |
| CN | 206904879 U | 1/2018 |
| CN | 211043831 U | 7/2020 |

\* cited by examiner

OPTICAL BEAM EXPANDER AND LUMINAIRE

CROSS-REFERENCE TO RELATED APPLICATIONS

This application is based upon and claims the priority of PCT patent application No. PCT/CN2020/137192 filed on Dec. 17, 2020 which claims priority to the Chinese patent application No. 201922307424.3 filed on Dec. 19, 2019, the entire contents of which are hereby incorporated by reference herein for all purposes.

TECHNICAL FIELD

The present disclosure relates to the optical field, and in particular, to an optical beam expander and a luminaire.

BACKGROUND

An optical beam expander is an optical device for adjusting an angle of light ray. For example, lighting lamps are mostly needed in a variety of scenarios such as shopping malls, hotels, museums, and houses. For the sake of optimized lighting effects on different surfaces and objects to be illuminated, optical beam expanders with different beam angles can be employed to optimize light emitted from the light source.

Bead-surface beam expanders with a bead-surface convex structure is often used in existing lighting devices to diffuse the light. Then, a reflector is used to reflect the light to adjust the divergence angle. The light may lose a certain amount of energy after being reflected by the reflector, thus resulting in low optical efficiency.

SUMMARY

The present disclosure provides an optical beam expander and a luminaire.

In first aspect, it is provided an optical beam expander, including: a collimating lens, configured for adjusting light emitted by a light source to parallel light; a condensing lens, the condensing lens comprising a plurality of inclined light-control surfaces, and any one of the light-control surfaces is not parallel to a plane in which the condensing lens is located, the condensing lens being configured for refracting the parallel light emitted from the collimating lens towards a direction of a center line of the condensing lens; and a fixing component, configured for fixing the collimating lens and the condensing lens, so that an optical axis of the collimating lens coincides with an optical axis of the condensing lens.

In second aspect, it is provided a luminaire, including a light source and the above-mentioned optical beam expander in the first aspect.

It is to be understood that the foregoing general description and the following detailed description are exemplary and explanatory only and are not restrictive of the disclosure.

BRIEF DESCRIPTION OF THE DRAWINGS

The accompanying drawings illustrated herein are provided for further understanding of the present disclosure, and constitute a part of the present disclosure. Examples of the present disclosure and descriptions thereof are intended to explain the present disclosure, but do not constitute inappropriate limitations to the present disclosure. In the drawings.

DETAILED DESCRIPTION

Figure 1A:
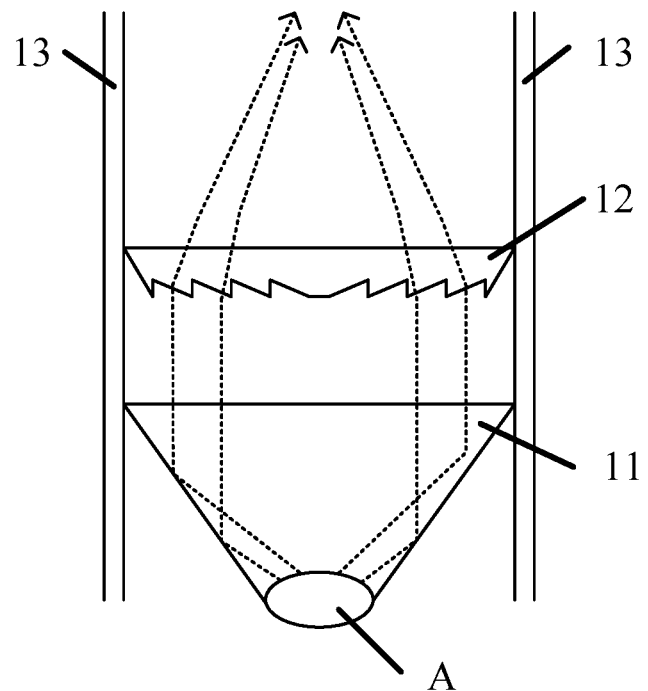
FIG. 1a is a first structural diagram of an optical beam expander provided by an example of the present disclosure.

Examples of the present disclosure will be described below in combination with the accompanying drawings of the present disclosure. Apparently, the described examples are merely a part rather than all the examples of the present disclosure. All other examples that are derived from the examples of the present disclosure by an ordinary skilled in the art without creative efforts shall fall within the protection scope of the present disclosure. The reference numerals in the accompanying drawings are merely used to distinguish different steps in technical solutions from each other, rather than delimiting execution orders of the steps. The specific execution order may be referred to the description in the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

An example of the present disclosure provides an optical beam expander. The optical beam expander is used in a lighting device to increase the lighting effects and the optical efficiency. As shown in FIG. 1a, the optical beam expander includes:

a collimating lens 11, configured for adjusting light emitted from a light source A to parallel light;

a condensing lens 12, the condensing lens 12 includes a plurality of inclined light-control surfaces 12a, and any one of the light-control surfaces 12a is not parallel to a plane in which the condensing lens 12 is located, the condensing lens 12 is configured for refracting the parallel light emitted from the collimating lens 11 towards a direction of a center line of the condensing lens 12;

a fixing component 13, configured for fixing the collimating lens 11 and the condensing lens 12, so that an optical axis of the collimating lens 11 coincides with an optical axis of the condensing lens 12.

The collimating lens refers to a lens or a lens assembly capable of changing lights from each point in an aperture diaphragm into a beam of collimated light column. The collimating lens may include one or more lenses, and the collimating lens may include a plurality of different types of lenses for refracting light so as to adjust a propagation direction. Preferably, the collimating lens is a total internal reflection (TIR) collimating lens.

Figure 1B:
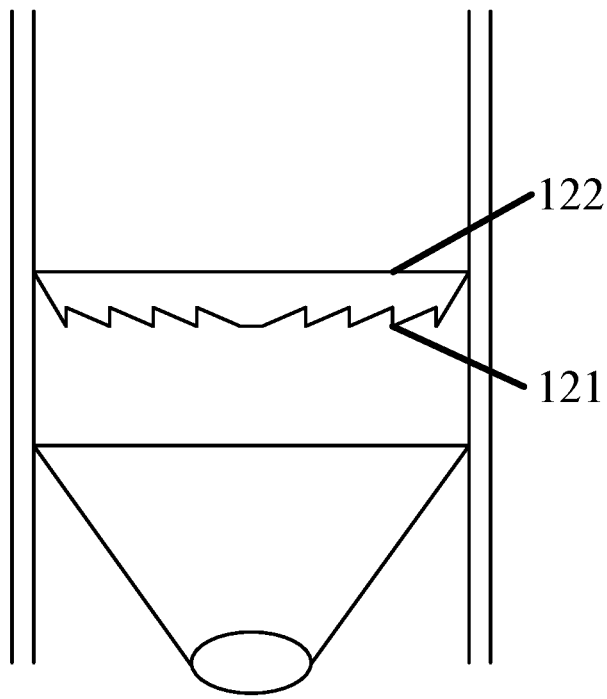
FIG. 1b is a second structural diagram of the optical beam expander provided by the example of the present disclosure.

Preferably, with reference to FIG. 1b, the condensing lens 12 includes a light incident surface 121 close to the collimating lens 11 and a light emergent surface 122 far away from the collimating lens 11. The light-control surfaces are provided on the light incident surface 121 and/or the light emergent surface 122 of the condensing lens 12. Referring to FIG. 1a, the condensing lens in the present example is a lens which includes light-control surfaces provided on the light incident surface. The optical beam expander provided by the present example includes the light source A, the collimating lens 11, the condensing lens 12, and the fixing component 13. The condensing lens in the present example is in a convolute form. For example, the condensing lens 12 includes a plurality of annular light-control surfaces. In other examples, the lens is a stretched-type lens, and the light-control surfaces are flat surfaces extending along a direction same as the stretch direction of the lens. A center point of the projection of each annular light-control surface on the plane in which the condensing lens is located coincides with a center point of the condensing lens. Preferably, the shape of each annular light-control surface corresponds to the shape of the condensing lens. The annular light-control surfaces are not parallel to the plane in which the condensing lens is located. After passing through the light-control surfaces, the parallel light emitted from the collimating lens 11 are deflected towards a direction of the center line, and a deflection angle is related to an inclined angle of the light-control surface. In FIG. 1a, light paths are shown as dotted lines, and the propagation directions of the lights are indicated by arrows.

The condensing lens illustrated in FIG. 1a is a flat lens having a plurality of light-control surfaces. In addition, the condensing lens may also be a convex lens. The structural characteristic of the convex lens is that the convex lens has a thick central region and a thin edge region, and the convex lens is capable of condensing the parallel light emitted from the collimating lens towards a direction of the center line. In practical application, the focal length of the convex lens may be determined according to actual requirements. When light passes through the condensing lens, the light converges towards a direction of the center line under the effect of the light-control surfaces, and further converges towards the direction of the center line under the effect of the convex lens.

Figure 1C:
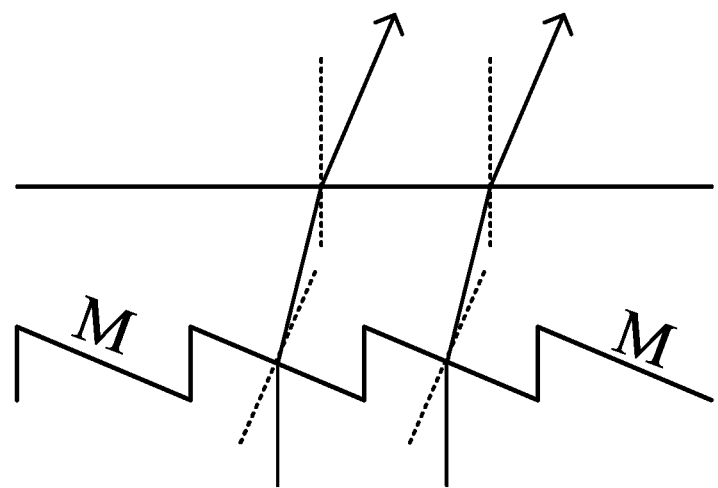
FIG. 1c is a first partial cross-section diagram of a condensing lens in the optical beam expander provided by the example of the present disclosure.

FIG. 1c shows a partial cross-section diagram of the condensing lens 12 having the light incident surface which is provided with the light-control surfaces taken along the center line; the condensing lens structure located on the left side of the center line is illustrated in FIG. 1c; the propagation directions of light rays are indicated by arrows, the normal lines of the surfaces where the light rays are deflected are shown as dotted lines in FIG. 1c; four light-control surfaces are illustrated in FIG. 1c. As shown, the parallel light rays emitted from the collimating lens propagate from the bottom to up; an angle between each light-control surface M of the condensing lens and the incident light ray is acute angle, i.e., the light-control surface is neither parallel nor perpendicular to the incident light ray. When incident light ray reaches the light-control surfaces M of the light incident surface, the incident light ray enters an optically denser medium from an optically thinner medium, and then the light ray is deflected towards the normal line after entering the condensing lens. Next, the light ray propagates in the condensing lens and reaches the light emergent surface, and then enters the optically thinner medium from the optically denser medium. The light ray is deflected along a direction contrary to the normal line after exiting the condensing lens. It can be seen that, the collimating lens having the light-control surfaces and provided by the present example is capable of refracting parallel light rays emitted from the collimating lens towards a direction of the center line of the condensing lens.

It should be noted that the shape of condensing lens is not limited to a circle and may also be ellipsoid, triangle, square, or in other shapes. The condensing lens and the collimating lens may be the same or different in shape and size. The condensing lens and the collimating lens are stacked such that light rays passing through the collimating lens can propagate to the condensing lens. The spacing between the condensing lens and the collimating lens may be adjusted according to actual requirements.

The fixing component 13 in the present example may be hollow cylinder-shaped. Preferably, the fixing component may be made of a light-tight material, and a reflecting thin film may be disposed on an inner wall of the fixing component to reduce the amount of light absorbed by the fixing component. The shape of the fixing component may match with those of the condensing lens and the collimating lens. For example, the condensing lens and the collimating lens are both in circular shape, and the fixing component is in cylindrical shape.

The fixing component is used for fixing the collimating lens and the condensing lens, so that the collimating lens and the condensing lens are parallel to each other. Preferably, the center line of the collimating lens coincides with that of the condensing lens. The fixing component is used for keeping the relative position of the collimating lens and the condensing lens unchanged.

The optical beam expander provided by the present example can refract the parallel light rays, which are adjusted by the collimating lens, to light rays converging and intersecting towards the center. The light rays do not need to be reflected by a reflector, so that the optical efficiency is effectively increased. In addition, because the light converges towards a direction of the center line of the beam expander, the amount of light absorbed by the sidewall can be reduced, which is conducive to increasing the optical efficiency of the luminaire.

On the basis of the optical beam expander provided by the above example, a first light-control surface is provided on the light incident surface of the condensing lens; and a point of the intersection of the plane in which the first light-control surface is located and the center line of the condensing lens is located on a semi-axis, pointing to the center point of the collimating lens with the center point of the condensing lens as the original point, of the center line.

Figure 2:
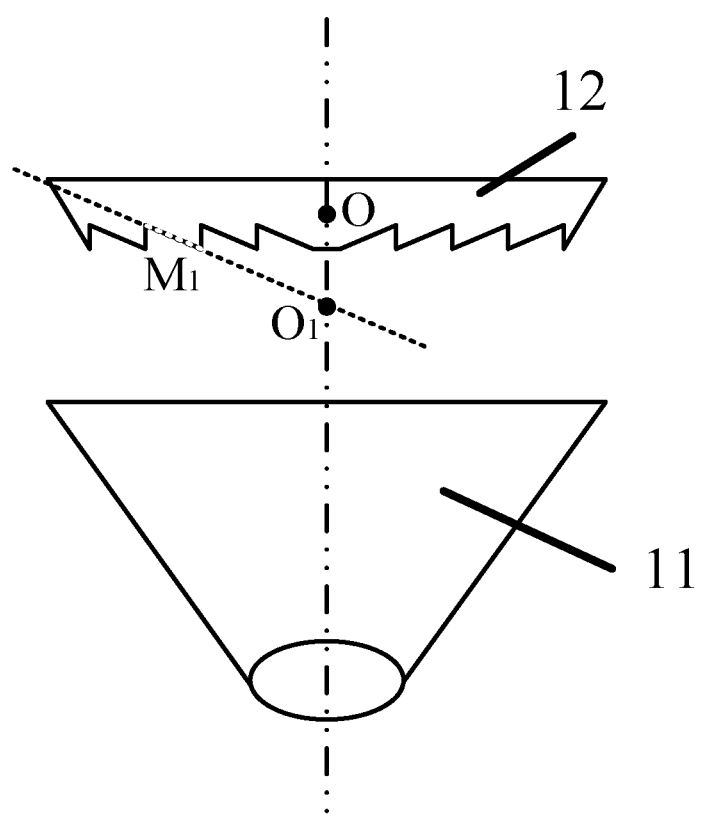
FIG. 2 is a third structural diagram of the optical beam expander provided by the example of the present disclosure.

As shown in FIG. 2, the first light-control surface M1 is provided on the condensing lens 12. The point O1 of the intersection of the plane in which the first light-control surface M1 is located and the center line of the condensing lens 12 is located in the semi-axis, pointing to the center point of the collimating lens 11 with the center point O of the condensing lens 12 as the original point, of the center line of the condensing lens 12. According to the solution provided by the present example, when incident light passes through the light incident surface of the condensing surface, the incident light can be deflected towards a direction of the center line under the effect of the first light-control surfaces.

On the basis of the optical beam expander provided by the above example, a second light-control surface is provided on the light emergent surface of the condensing lens; and a point of the intersection of the plane in which the second light-control surface is located and the center line of the condensing lens is located on a semi-axis, pointing away from the center point of the collimating lens with the center point of the condensing lens as the original point, of the center line.

Figure 3A:
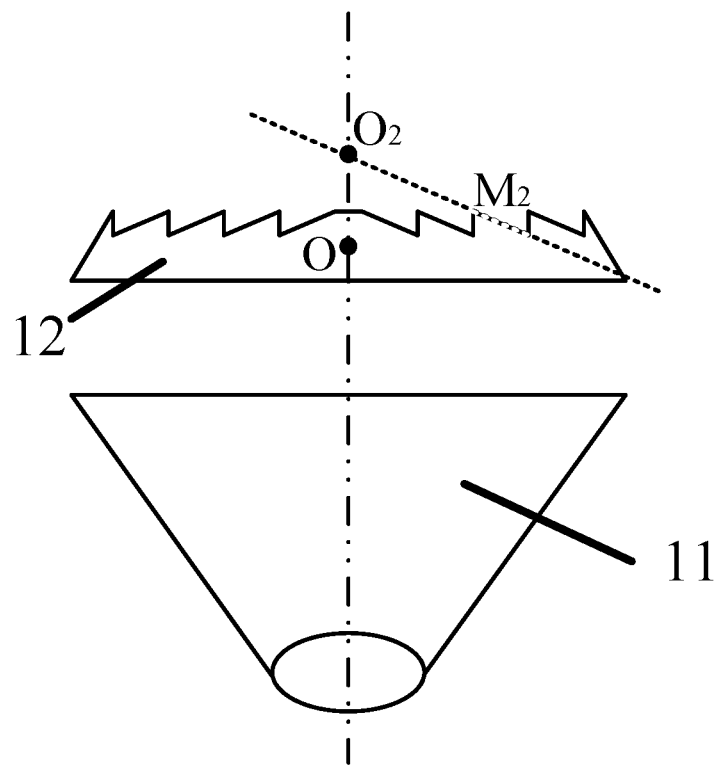
FIG. 3a is a fourth structural diagram of the optical beam expander provided by the example of the present disclosure.

As shown in FIG. 3a, the second light-control surface M2 is provided on the light emergent surface of the condensing lens 12. The point O2 of the intersection of the plane in which the second light-control surface M2 is located and the center line of the condensing lens 12 is located on the semi-axis, pointing away from the center point of the collimating lens 11 with the center point O of the condensing lens 12 as the original point, of the center line. With the solution provided by the present example, when incident light passes through the light emergent surface of the condensing surface, the incident light can be deflected towards a direction of the center line under the effect of the second light-control surfaces.

Figure 3B:
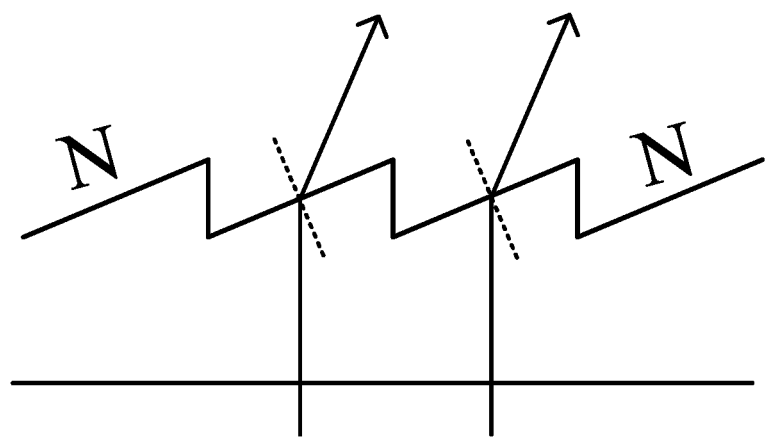
FIG. 3b is a second partial cross-section diagram of the condensing lens in the optical beam expander provided by the example of the present disclosure.

Referring to FIG. 3b, the propagation directions of light rays are indicated by arrows, and the condensing lens structure on the left side of the center line is illustrated in FIG. 3b. The normal lines of the surfaces where light rays are deflected are shown as dotted lines, and four light-control surfaces are included in FIG. 3b. As shown, parallel light rays emitted from the collimating lens propagate from bottom to up. The light rays firstly pass through the flat light incident surface. Because the light incident surface is perpendicular to the parallel incident light rays, the incident light rays are not deflected. An angle between the light-control surface N on the light emergent surface of the condensing lens and the incident light ray is acute angle, i.e., the light-control surface is neither parallel nor perpendicular to the incident light ray. When the incident light ray reach the light-control surface N of the light emergent surface, the incident light ray enters the optically thinner medium from the optically denser medium. The light ray is deflected along a direction contrary to the normal line after exiting the condensing lens. It can be seen that, the collimating lens having the light-control surfaces provided by the present example is capable of refracting parallel light rays emitted from the collimating lens towards a direction of the center line of the condensing lens.

Figure 4:
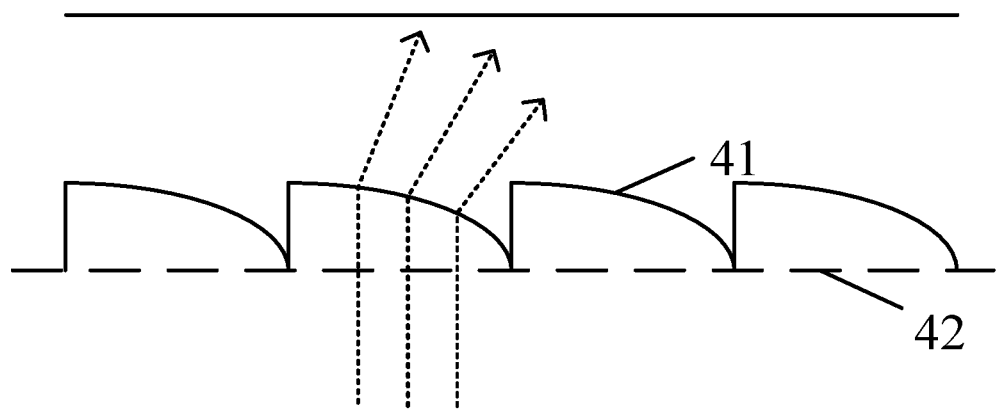
FIG. 4 is a third partial cross-section diagram of the condensing lens in the optical beam expander provided by the example of the present disclosure.

On the basis of the optical beam expander provided by the above example, preferably, as shown in FIG. 4, the first light-control surface is an arc surface concaved towards the light emergent surface.

FIG. 4 shows a partial cross-section diagram of the condensing lens having the light incident surface 42 which is provided with first light-control surfaces 41 taken along the center line, in which the structural diagram on the left side of the center line is illustrated and the light paths of the parallel incident light rays passing through the first light-control surface 41 are shown as dotted lines. Because the first light-control surface 41 is the arc surface, a plurality of light rays, after passing through the first light-control surface 41, are deflected at different angles and towards the center line. With the solution provided by the present example, the shape of light distribution can be further optimized, and the amount of light absorbed by the sidewall can be reduced, thereby being conducive to increasing the optical efficiency of the luminaire.

Figure 5:
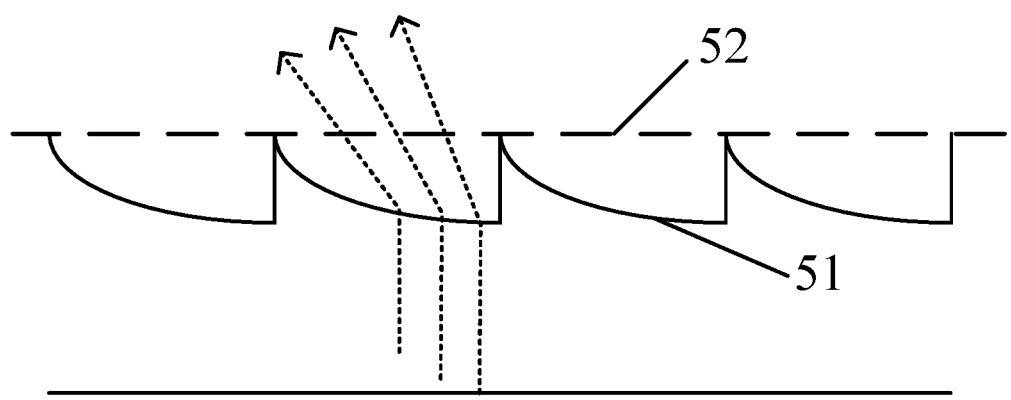
FIG. 5 is a fourth partial cross-section diagram of the condensing lens in the optical beam expander provided by the example of the present disclosure.

On the basis of the optical beam expander provided by the above example, preferably, as shown in FIG. 5, the second light-control surface is an arc surface concaved towards the light incident surface.

FIG. 5 shows a partial cross-section diagram of the condensing lens having the light emergent surface 52 which is provided with second light-control surfaces 51 taken along the center line, in which the structural diagram on the right side of the center line is illustrated. The light paths of the parallel incident light rays passing through the second light-control surface 51 are shown as dotted lines. Because the second light-control surface 51 is the arc surface, a plurality of light rays, after passing through the second light-control surface 51, are deflected at different angles and towards a direction of the center line. With the solution provided by the present example, the shape of light distribution can be further optimized, and the amount of light absorbed by the sidewall can be reduced, thereby being conducive to increasing the optical efficiency of the luminaire.

Preferably, the light-control surfaces may be provided on both of the light incident surface and the light emergent surface as required in actual application, and the first light-control surfaces provided on the light incident surface and the second light-control surfaces provided on the light emergent surface may be all arc surfaces. The extent to which the light-control surface is concaved may be set according to actual requirements, and the light-control surfaces located in different regions of the condensing lens may be concaved to the same extent or to different extents.

Figure 6:
FIG. 6 is a fifth partial cross-section diagram of the condensing lens in the optical beam expander provided by the example of the present disclosure.

On the basis of the optical beam expander provided by the above example, as shown in FIG. 6, the condensing lens further includes a connection surface 61 that connects adjacent light-control surfaces, the connection surface is perpendicular to the plane in which the condensing lens is located. The connection surfaces 61 are shown as dotted lines in FIG. 6. The connection surfaces are perpendicular to the plane in which the condensing lens is located. When parallel light rays reach the side where the light-control surfaces are located, the parallel light rays are parallel to the connection surfaces, and light paths are not affected by the connection surfaces. Thus, all the light rays passing through the side where the light-control surfaces are located can be deflected towards the center direction under the effect of the light-control surfaces. As a result, the amount of light absorbed by the sidewall can be reduced, and the optical efficiency of the luminaire can be increased.

Figure 7:
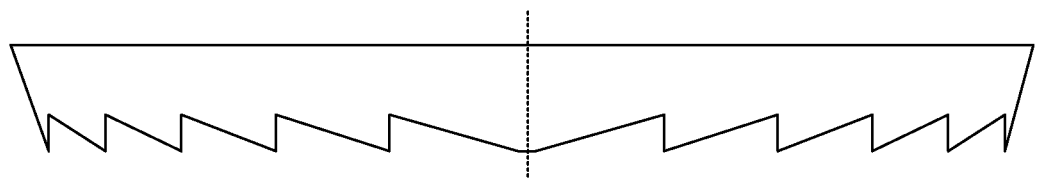
FIG. 7 is a sixth partial cross-section diagram of the condensing lens in the optical beam expander provided by the example of the present disclosure.

On the basis of the optical beam expander provided by the above example, preferably, as shown in FIG. 7, an inclination angle of each of the plurality of light-control surfaces of the condensing lens is positively correlated with a distance from the light-control surface to the center line. In FIG. 7, the center line is shown as a dotted line. In the condensing lens, the inclination angle of the light-control surface close to the center line is small, while the inclination angle of the light-control surface far away from the center line is large. On the basis of such a structure, parallel light rays propagating to the regions close to the center line are deflected at small angles after passing through the condensing lens, while parallel light rays propagating to the regions far away from the center line are deflected at large angles after passing through the condensing lens. Thus, the convergence effect of light rays towards a direction of the center line can be optimized, and the amount of light absorbed by the sidewalls can be further reduced. As a result, the light rays passing through the regions close to the center line can be avoided from being deflected to the sidewalls. In addition, the region close to the center line may be a flat surface without light-control surface, so that the light rays can propagate straightly through the region in vicinity of the center line without change in their light paths.

On the basis of the optical beam expander provided by the above example, the light-control surfaces are provided on the light incident surface and the light emergent surface of the condensing lens, and the light-control surfaces provided on the light incident surface are symmetrical to the light-control surfaces provided on the light emergent surface.

Figure 8:
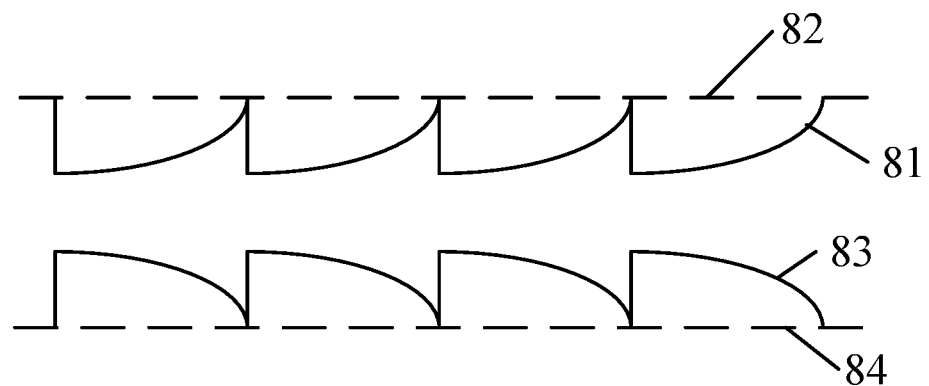
FIG. 8 is a seventh partial cross-section diagram of the condensing lens in the optical beam expander provided by the example of the present disclosure.

FIG. 8 shows a partial cross-section diagram of the condensing lens taken along the center line, in which both of the light incident surface and the light emergent surface of the condensing lens have the light-control surfaces, and the light-control surfaces are arc surfaces. Herein, the light incident surface 84 has first light-control surfaces 83, while the light emergent surface 82 has second light-control surfaces 81. On the basis of such a structure, when passing through the condensing lens, parallel incident lights firstly converge towards the direction of the center line through the first light-control surfaces 83, and then further converge towards the direction of the center line through the second light-control surfaces 81. With the structure provided by the present example, light rays can converge for several times, thus resulting in an optimized convergence effect.

Figure 9A:
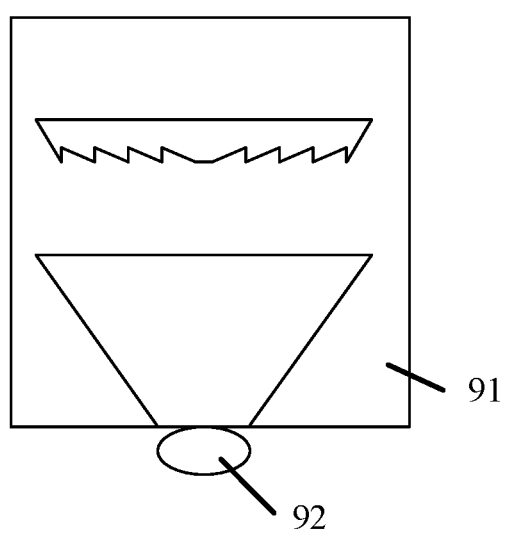
FIG. 9a is a first structural diagram of a luminaire provided by an example of the present disclosure.

The example of the present disclosure provides a luminaire, as shown in FIG. 9a, including a light source 92 and the optical beam expander 91 as described in any one of the above examples. In addition, the luminaire may further include a power source, a switch, a control circuit, etc. The luminaire may be disposed on a movable element, so that the angle of light ray of the luminaire is adjusted as required. It should be noted that in the structure illustrated in FIG. 9a, light-control surfaces are provided on the light incident surface of a condensing lens. Actually, the light-control surfaces may also be provided on the light emergent surface, or on both of the light incident surface and the light emergent surface.

Figure 9B:
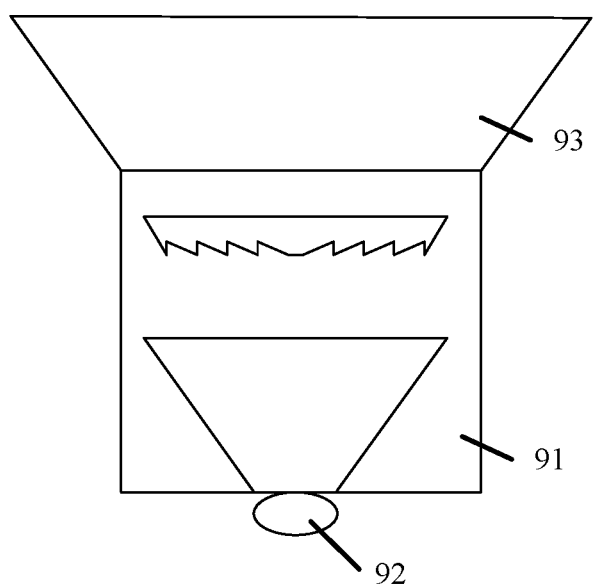
FIG. 9b is a second structural diagram of the optical beam expander provided by the example of the present disclosure.

Preferably, the luminaire is a spot lamp, as shown in FIG. 9b, further including an optical reflector 93 disposed at an end of the optical beam expander 91 far away from the light source 92, the optical reflector 93 is used for reflecting part of light rays emitted from the optical beam expander to an illuminated target area. In the case that the optical beam expander 91 disclosed herein is not adopted, the angle of light rays emitted by the light source 92 is adjusted through the reflection of the reflector 93 and thus allowed to propagate towards a direction of the target. However, during the reflection, the light rays may lose a certain amount of energy, thus resulting in low optical efficiency. The solution provided by the present example adopts the optical beam expander 91 described above, which can converge light rays emitted by the light source and deflect the light rays towards the direction of the center line, thereby allowing most of light rays to propagate towards the direction of the target without the reflection of the optical reflector 93. Thus, the optical efficiency is effectively increased.

In addition, the optical reflector 93 in the luminaire provided by the present example can further adjust the light path of a few light rays emitted from the optical beam expander 91, ensuring that the light paths of the light rays emitted by the luminaire propagate towards the direction of the target. In this way, the shape of light distribution can be further optimized while providing the luminaire with increased optical efficiency.

The luminaire provided by the present example can converge the light rays emitted by the light source and is used for illumination. Because the spot lamp may be directed to illuminate the target area, it can be used for mood lighting. The luminaire provided by the present example can reduce the amount of light absorbed by the sidewalls with increased optical efficiency.

An example of the present disclosure provides an optical beam expander including a collimating lens and a condensing lens. The condensing lens is used for refracting parallel light emitted from the collimating lens towards a direction of a center line of the condensing lens. The optical beam expander can refract the parallel light adjusted by the collimating lens to form light rays converging and intersecting at a center. The light rays do not need to be reflected by a reflector, so that the optical efficiency is effectively increased. In addition, because the light converges towards the center line of the beam expander, the amount of light absorbed by the sidewall can be reduced, which is conducive to increasing the optical efficiency of the luminaire.

It should be noted that the terms "including", "comprising" or any other variants thereof used herein are intended to cover non-exclusive inclusion, so that a process, a method, an article or a device including a series of elements includes not only those elements but also other elements not explicitly listed, or other inherent elements in the process, the method, the article, or the device. Without additional limitations, the element defined by the wording "including a . . . " does not exclude the presence of any additional identical element in the process, the method, the article, or the device including the element.

While the examples of the present disclosure are described above with reference to the accompanying drawings, the present disclosure is not limited to the specific implementations described above. The above-mentioned implementations are merely illustrative rather than limiting. Under the inspiration of the present disclosure, an ordinary skilled in the art can obtain several variants without departing from the purposes of the present disclosure and the protection scope defined by the claims, and these variants shall fall within the protection scope of the present disclosure.

The invention claimed is:

1. An optical beam expander, comprising:
a collimating lens, configured for adjusting light emitted by a light source to parallel light;
a condensing lens, the condensing lens comprising a plurality of inclined light-control surfaces, and any one of the light-control surfaces is not parallel to a plane in which the condensing lens is located, the condensing lens being configured for refracting the parallel light emitted from the collimating lens towards a direction of a center line of the condensing lens; and
a fixing component, configured for fixing the collimating lens and the condensing lens, so that an optical axis of the collimating lens coincides with an optical axis of the condensing lens, wherein the parallel light emitted from the light source that is refracted by the collimating lens is further directed by the condensing lens towards the direction of the center line that is substantially coincided with the axis of the collimating lens and the axis of the condensing lens;
wherein the condensing lens comprises a light incident surface and a light emergent surface, the collimating lens is closer to the light incident surface than the light emergent surface;
and the light-control surfaces are provided on the light incident surface or the light emergent surface of the condensing lens;
wherein a first light-control surface is provided on the light incident surface of the condensing lens, the first light-control surface being an arc surface concaved towards the light emergent surface, or,
a second light-control surface is provided on the light emergent surface of the condensing lens, the second light-control surface being an arc surface concaved towards the light incident surface.

2. The optical beam expander according to claim 1, wherein a point of the intersection of a plane in which the first light-control surface is located and the center line of the condensing lens is located in a semi-axis of the center line, and the semi-axis of the center line points to a center point of the collimating lens with a center point of the condensing lens as an original point.

3. The optical beam expander according to claim 1, wherein a point of intersection of a plane in which the second light-control surface is located and the center line of the condensing lens is located in a semi-axis of the center line, and the semi-axis of the center line points away from a center point of the collimating lens with a center point of the condensing lens as an original point.

4. The optical beam expander according to claim 1, wherein the condensing lens further comprises a connection surface that connect adjacent light-control surfaces, the connection surface is perpendicular to the plane in which the condensing lens is located.

5. The optical beam expander according to claim 1, wherein inclination angles of the plurality of light-control surfaces of the condensing lens are positively correlated with a distance from the light-control surface to the center line.

6. The optical beam expander according to claim 1, wherein the light-control surfaces are provided on the light incident surface and the light emergent surface of the condensing lens, and the light-control surfaces provided on the light incident surface are symmetrical to the light-control surfaces provided on the light emergent surface.

7. The optical beam expander according to claim 1, wherein the collimating lens is a total internal reflection (TIR) collimating lens.

8. A luminaire, comprising a light source and an optical beam expander, wherein the optical beam expander further comprises:
a collimating lens, configured for adjusting light emitted by a light source to parallel light;
a condensing lens, the condensing lens comprising a plurality of inclined light-control surfaces, and any one of the light-control surfaces is not parallel to a plane in which the condensing lens is located, the condensing lens being configured for refracting the parallel light emitted from the collimating lens towards a direction of a center line of the condensing lens; and
a fixing component, configured for fixing the collimating lens and the condensing lens, so that an optical axis of the collimating lens coincides with an optical axis of the condensing lens, wherein the parallel light emitted from the light source that is refracted by the collimating lens is further directed by the condensing lens towards the direction of the center line that is substantially coincided with the axis of the collimating lens and the axis of the condensing lens;
wherein the condensing lens comprises a light incident surface and a light emergent surface, the collimating lens is closer to the light incident surface than the light emergent surface;
and the light-control surfaces are provided on the light incident surface or the light emergent surface of the condensing lens;
wherein a first light-control surface is provided on the light incident surface of the condensing lens, the first light-control surface being an arc surface concaved towards the light emergent surface, or,
a second light-control surface is provided on the light emergent surface of the condensing lens,
the second light-control surface being an arc surface concaved towards the light incident surface.

9. The luminaire according to claim 8, wherein the luminaire is a spot lamp and further comprises:
an optical reflector, disposed at an end of the optical beam expander, wherein the optical reflector and the light source are on opposite ends of the optical beam expander; and configured for reflecting part of light emitted from the optical beam expander to an illuminated target area.

* * * * *